(12) United States Patent
Sehrawat (10) Patent No.: US 12,008,146 B2
(45) Date of Patent: Jun. 11, 2024

(54) CODE-BASED SIGNATURES FOR SECURE PROGRAMS

(71) Applicant: Seagate Technology LLC, Fremont, CA (US)

(72) Inventor: Vipin Singh Sehrawat, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 563 days.

(21) Appl. No.: 17/219,263

(22) Filed: Mar. 31, 2021

(65) Prior Publication Data

US 2022/0318431 A1 Oct. 6, 2022

(51) Int. Cl.
*G06F 21/64* (2013.01)
*G06F 8/71* (2018.01)

(52) U.S. Cl.
CPC .............. *G06F 21/64* (2013.01); *G06F 8/71* (2013.01)

(58) Field of Classification Search
CPC .................................. G06F 21/64; G06F 8/71
See application file for complete search history.

(56) References Cited

U.S. PATENT DOCUMENTS

| | | | | |
|---|---|---|---|---|
| 9,792,114 | B1 * | 10/2017 | Schaefer | G06F 8/75 |
| 10,872,155 | B2 * | 12/2020 | Oh | G06F 21/64 |
| 10,999,078 | B2 * | 5/2021 | Kawabata | H04L 9/16 |
| 2007/0074034 | A1 * | 3/2007 | Adams | G06F 21/629 |
| | | | | 713/176 |
| 2015/0200783 | A1 * | 7/2015 | Abt, Jr. | H04L 9/008 |
| | | | | 713/176 |
| 2018/0198613 | A1 * | 7/2018 | Anderson | G06F 21/602 |
| 2019/0052467 | A1 * | 2/2019 | Bettger | H04L 9/088 |
| 2019/0207957 | A1 * | 7/2019 | Espinosa | G06F 8/65 |
| 2021/0064723 | A1 * | 3/2021 | Drake | G06F 21/125 |

FOREIGN PATENT DOCUMENTS

| | | | | | |
|---|---|---|---|---|---|
| CN | 111723383 | A | * | 9/2020 | G06F 21/53 |
| CN | 112199649 | A | * | 1/2021 | G06F 21/31 |
| CN | 113364600 | A | * | 9/2021 | |
| CN | 113422688 | A | * | 9/2021 | |
| CN | 114491578 | A | * | 5/2022 | |

(Continued)

OTHER PUBLICATIONS

Banerjee, Abhishek et al. "New and Improved Key-Homomorphic Pseudorandom Functions." In: CRYPTO. 2014, pp. 353-370.

(Continued)

*Primary Examiner* — Sarah Su
(74) *Attorney, Agent, or Firm* — HOLZER PATEL DRENNAN (57) ABSTRACT

A computer-implemented method receives at least two unique versions of program code of a program, generates a code-based key for each unique version of the program code, generates a code-based signature for each unique version of the program using a bi-homomorphic pseudorandom function selected from a family of bi-homomorphic pseudorandom functions. Each code-based signature is generated by the selected bi-homomorphic pseudorandom function based on the corresponding code-based key. Each generated code-based signature for each unique version of the program code is incorporated into the program code of the corresponding unique version of the program.

20 Claims, 8 Drawing Sheets

(56) References Cited

FOREIGN PATENT DOCUMENTS

| CN | 114579857 A | * | 6/2022 | |
|---|---|---|---|---|
| CN | 114996754 A | * | 9/2022 | |
| CN | 115376590 A | * | 11/2022 | ............. G06F 21/54 |
| JP | H08212141 A | * | 8/1996 | ............. G06F 12/14 |
| WO | WO-0225409 A2 | * | 3/2002 | ............. G06F 21/10 |
| WO | WO-2013067542 A1 | * | 5/2013 | ......... G01N 33/6803 |
| WO | WO-2013161974 A1 | * | 10/2013 | ............. G06F 21/64 |

OTHER PUBLICATIONS

Boneh, Dan et al. "Key homomorphic PRFs and their applications." In: CRYPTO. 2013, pp. 410-428.

Curtmola, Reza et al. "Searchable symmetric encryption: improved definitions and efficient constructions." In: ACM conference on Computer and communications security. 2006, pp. 79-88.

CVE Details DB. Security Vulnerabilities (Memory Corruption). url: https://www.cvedetails.com/vulnerability-list/opmemc-1/memory-corruption.html. [Accessed Mar. 30, 2021].

Goktas, Enes et al. "Speculative Probing: Hacking Blind in the Spectre Era." In: ACM CCS. 2020, pp. 1871-1885.

Goldreich, Oded et al. "How to construct random functions." In: Journal of the ACM (JACM) 33 (1986), pp. 792-807.

Naor, Moni et al. "Distributed Pseudo-random Functions and KDCs." In: EUROCRYPT. 1999, pp. 327-346.

Parra, Jhordany Rodriguez et al. "A Noiseless Key-Homomorphic PRF: Application on Distributed Storage Systems." In: Australasian Conference on Information Security and Privacy. 2016, pp. 505-513.

Sehrawat, Vipin Singh et al. "Bi-Homomorphic Lattice-Based PRFs and Unidirectional Updatable Encryption." In: CANS. Vol. 11829. LNCS, Springer, 2019, pp. 3-23.

Catalano, D et al. Homomorphic Signatures with Efficient Verification for Polynomial Functions. IACR 2014.

Wikipedia—Homomorphic signatures for network coding (https://en.wikipedia.org/wiki/Homomorphic_signatures_for_network_coding) [Accessed Mar. 30, 2021].

Wikipedia—Software diversity (https://en.wikipedia.org/wiki/Software_diversity) [Accessed Mar. 30, 2021].

Sehrawat, Vipin Singh et al. "Strengthening Software Diversity Through Targeted Diversification." Secureware 2016: The Tenth International Conference on Emerging Security Information, Systems and Technologies, IARIA, 2016.

Larsen, Per et al. "SoK: Automated Software Diversity." Conference Paper in Synthesis Lectures on Information Security Privacy and Trust; May 2014.

* cited by examiner

CODE-BASED SIGNATURES FOR SECURE PROGRAMS

SUMMARY

The described technology provides methods and systems for receiving at least two unique versions of program code of a program, generating a code-based key for each unique version of the program code, generating a code-based signature for each unique version of the program using a bi-homomorphic pseudorandom function selected from a family of bi-homomorphic pseudorandom functions. Each code-based signature is generated by the selected bi-homomorphic pseudorandom function based on the corresponding code-based key. Each generated code-based signature for each unique version of the program code is incorporated into the program code of the corresponding unique version of the program.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Malicious attacks on software remain rampant. In a current scenario, attackers try to find vulnerabilities in popular software that enable the attackers to infect a large number of systems using the same attack. Various randomization-based defense mechanisms can be employed to protect systems against stack overwrite attacks. However, code-reuse attacks, which execute a target program's code in an unintended sequence, are able to defeat many randomization-based defense mechanisms.

Software diversity algorithms generate "similar but different" versions of a software program, with the aim of reducing the widespread impact of generic attacks on a single version of the program. By producing a large number of structurally different but semantically equivalent versions of the program (e.g., through rewriting a program into structurally-different versions), the scope of a successful attack on one program version can be limited to just one program version, rather than allowing it to impact all users of versions of the program. That is, the diverse versions of the software have identical behavior but a negligible number of overlapping code-reuse gadgets among them. "Overlapping gadget" means that the same code or gadget is present at the same position in different versions. "Structurally diverse" means that the program code images of the different program version files are different (e.g., different bit values at different locations within the files). The differences can be positioned throughout the whole file within both program code and data portions of the file, within the program code portions of the file, within program data portions of the file, etc. Accordingly, software diversity can reduce overlapping gadgets to a negligible level, and the attacker's assumptions that are true for one program version do not hold for other program versions.

The described technology provides a signature scheme that is tailored to work seamlessly with randomized software diversity and code-rewriting algorithms and to generate signatures that are:

Tied to the security features of the programs,
Easily verified with standalone verification,
Compact (e.g., ~512 bits)
Fine-grained: tied to both publisher/author and customer, and
Not dependent upon public key cryptography.

Using the described technology, a user (e.g., a customer) can independently verify the integrity (e.g., structural integrity) of one program version using a second program version. For example, a user installs one program version on one workstation/server and another program version on a second workstation/server. The user can run a verification system on the two program versions to verify the integrity of either program version (e.g., to confirm that the program has not been corrupted, such as by a malicious attack), without reliance on a third-party communication or on a certificate authority.

Figure 1:
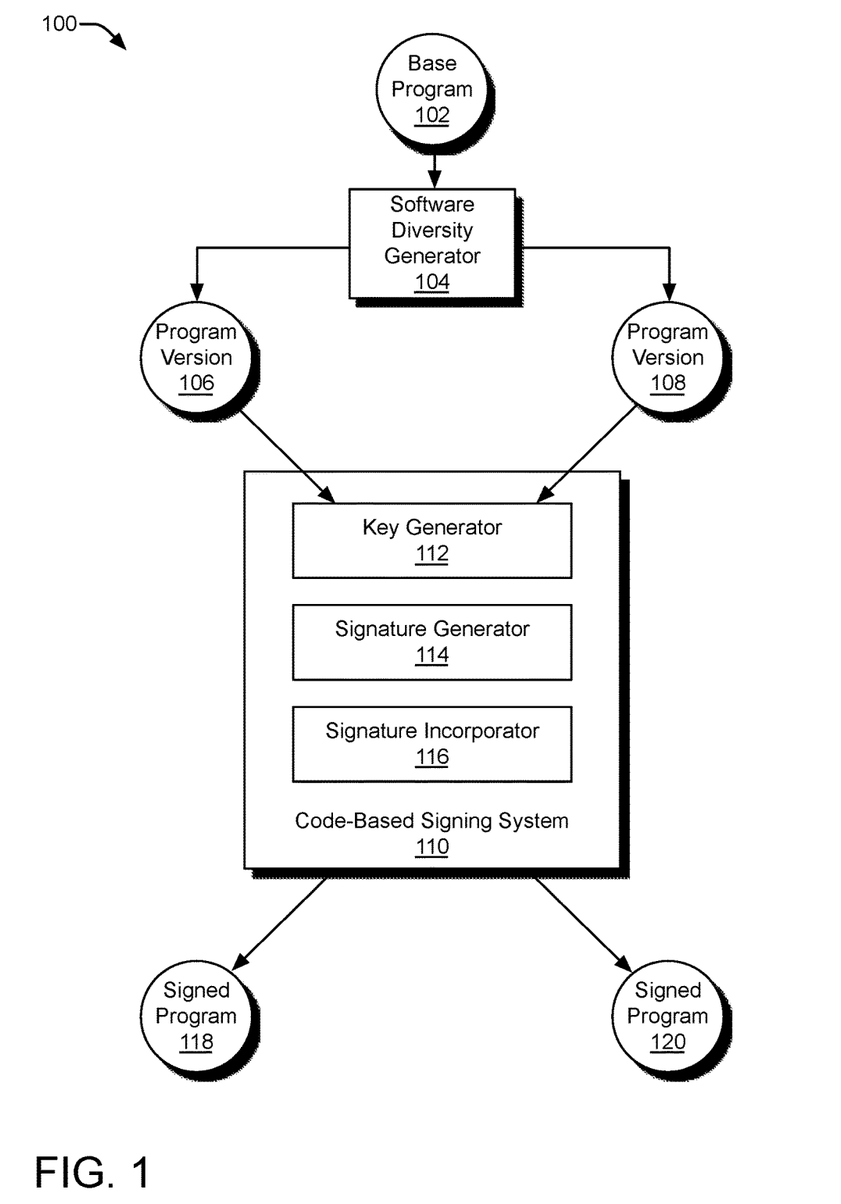
FIG. 1 illustrates an example code-based signing system.

FIG. 1 illustrates an example code-based signing system 100. A base program 102 is input to a software diversity generator 104, which generates multiple structurally different but semantically equivalent versions (e.g., a program version 106 and program version 108) of the base program 102. For the following description, assume a company S with a secret s develops and/or owns the base program 102 and is signing different versions of the program for use by a customer A, identified by a user identifier a.

Examples of software diversification schemes include without limitation equivalent instruction substitution, equivalent instruction sequences, instruction reordering, garbage code (e.g., no-operation or NOP instructions) insertion, register allocation randomization, basic block reordering, opaque predicate insertion, branch function insertion, stack layout randomization, function parameter randomization, inlining/outlining/splitting, control flow flattening, function reordering, basic address randomization, program encoding randomization, and data randomization. It should be understood that software diversity may also be achieved by manually or semi-manually introducing structural differences into different versions of the program during the code writing and/or compilation. Accordingly, software diversity can yield different versions of the program that are secure and structurally unique from each other in some faction, such as including a very small number of overlapping gadgets.

The two versions of the program are input to a code-based signing system 110, which includes a key generator 112, a signature generator 114, and a signature incorporator 116. The key generator 112 receives the different versions of the program and derives a unique key for each version based on some or all of the program code of that version. Because the program code of each version is structurally unique and (pseudo)randomized, the derived keys are also unique and (pseudo)random. For example, a key derivation function (KDF), such as a cryptographic hash function, can be applied to some or all of the program code of each version to yield unique code-based keys $K_{106}$ and $K_{108}$ (corresponding to the program version 106 and the program version 108, respectively).

Figure 5:
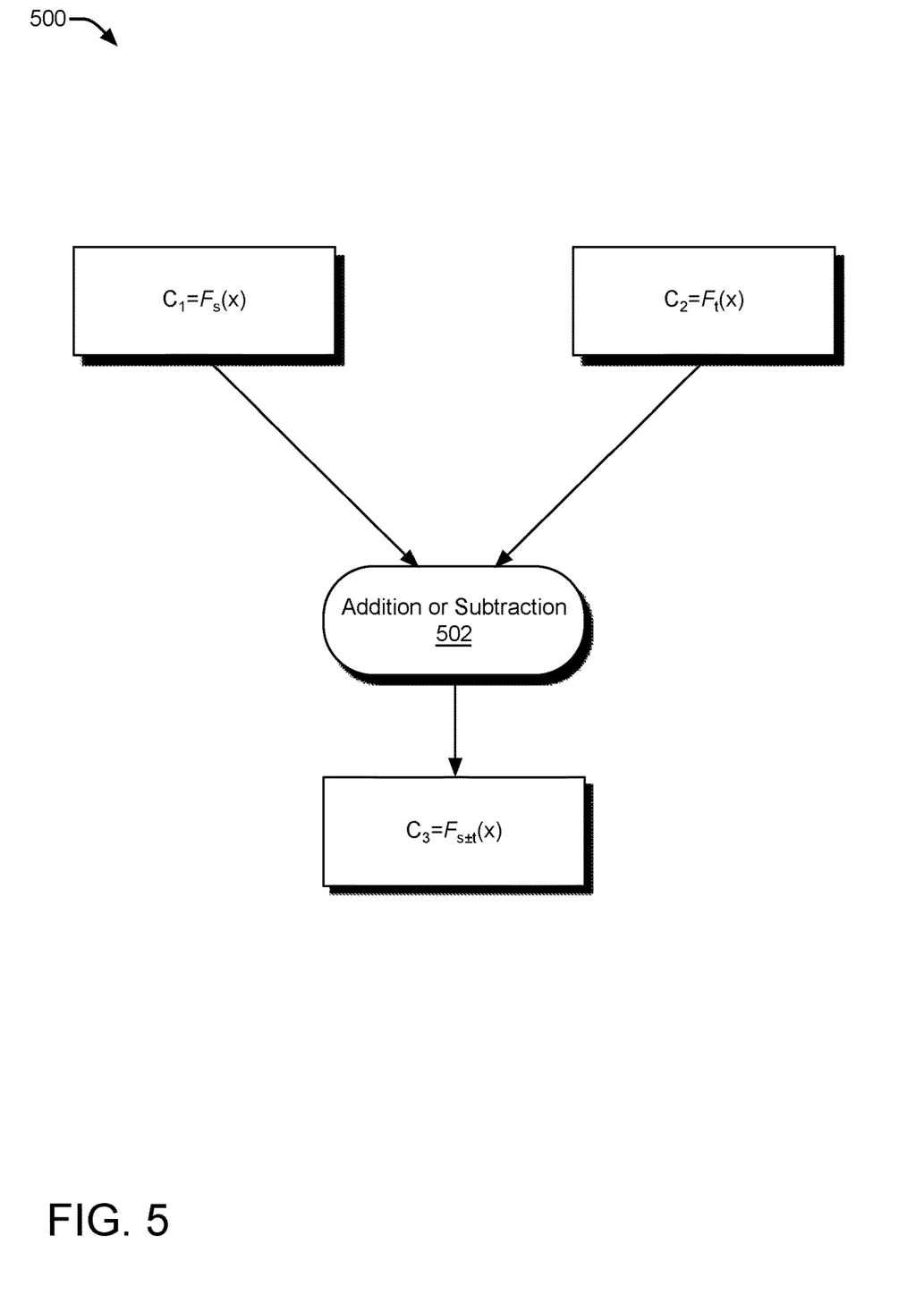
FIG. 5 illustrates example key homomorphism providing useful concepts for code-based signatures.
Figure 6:
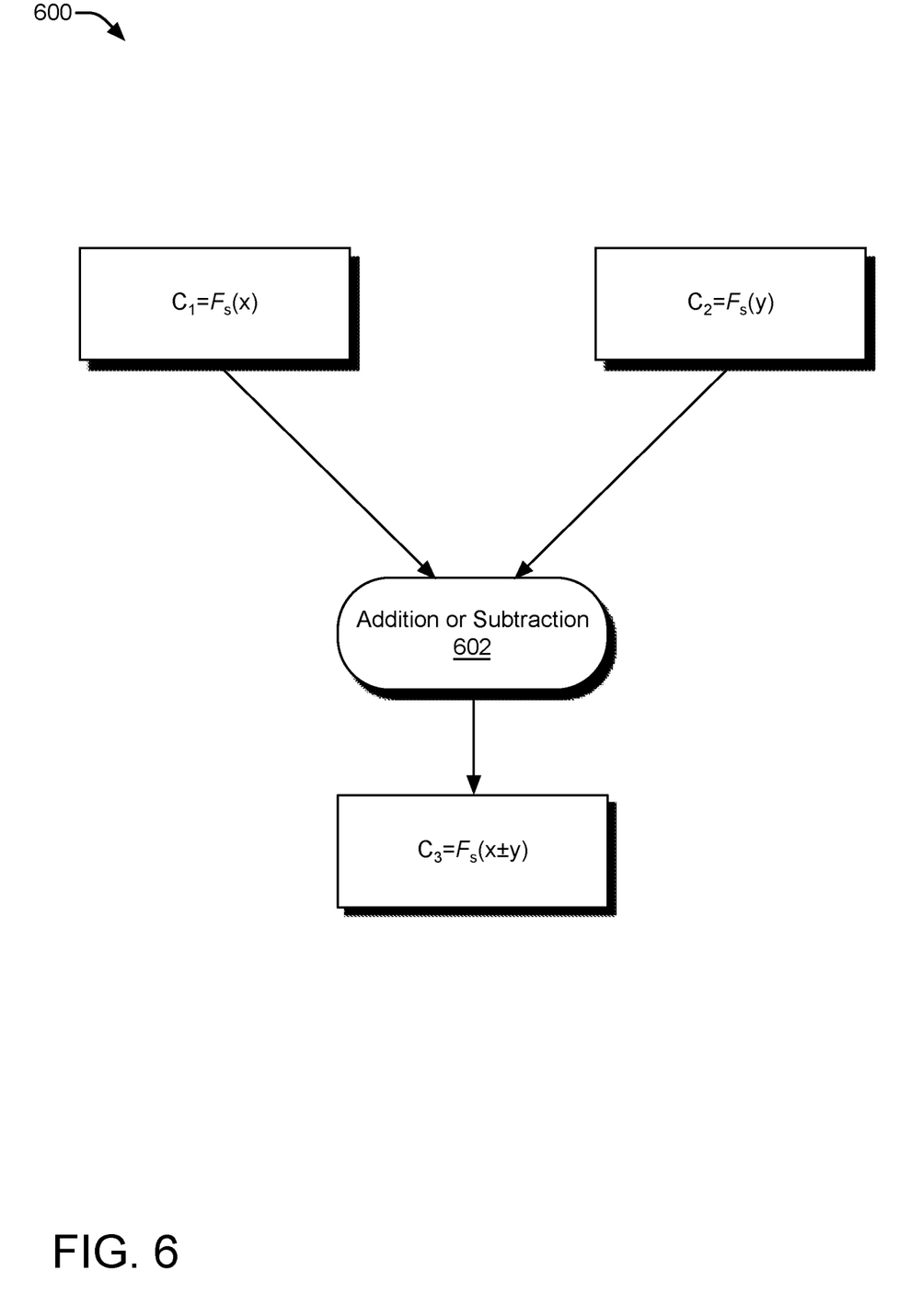
FIG. 6 illustrates example input homomorphism providing useful concepts for code-based signatures.
Figure 7:
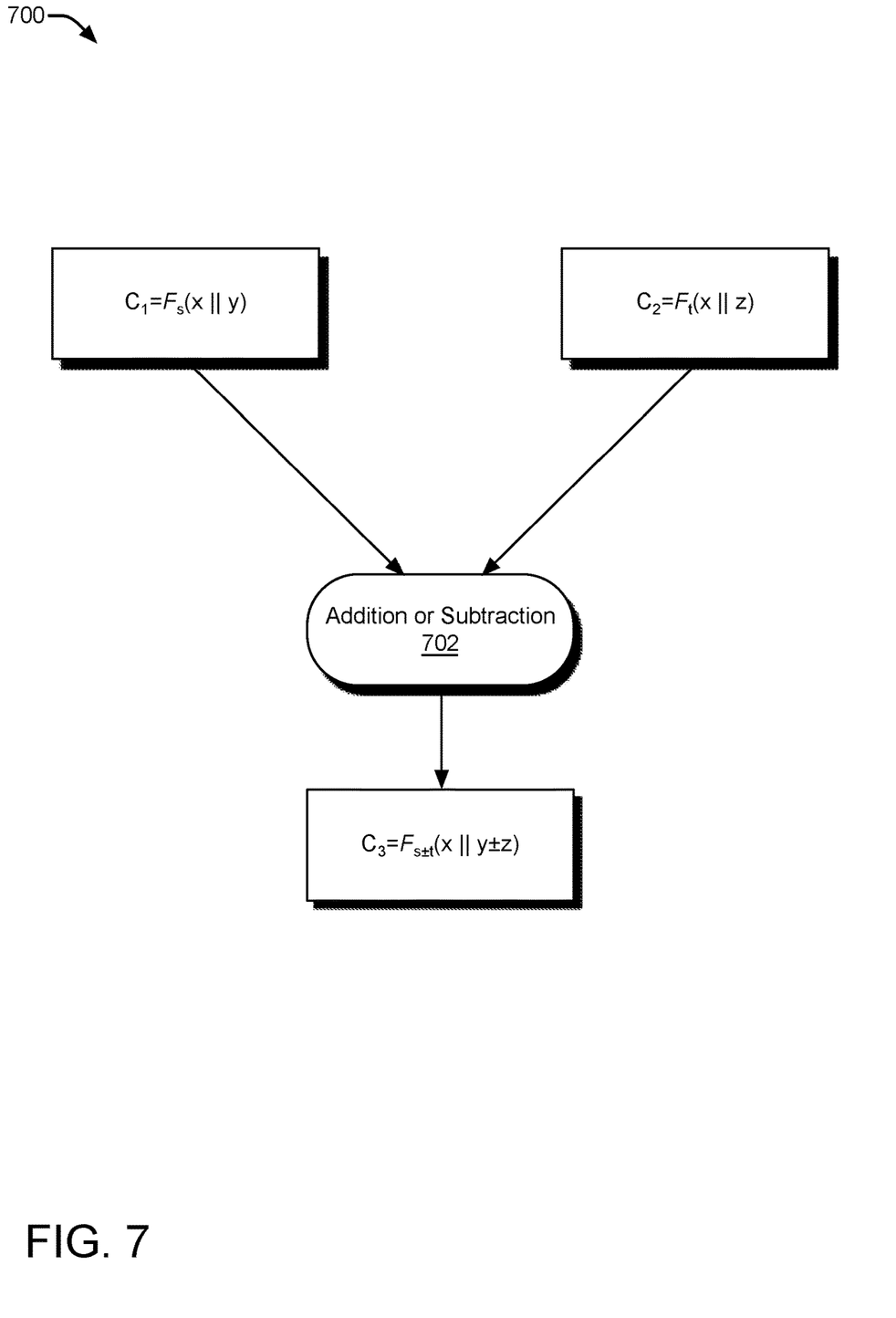
FIG. 7 illustrates example bi-homomorphism useful for code-based signatures.

The signature generator 114 generates a unique signature for each version using the derived unique code-based keys using a bi-homomorphic pseudorandom function (PRF) F, which is described in more detail with respect to FIGS. 5-7. In one implementation, the signature generator 114 computes a signature $S_{106}$ for the program version 106 and a signature $S_{108}$ for the program version 108 in FIG. 1, such as by using the following computations, although other computations may be employed.

$S_{106}=F_{K_{106}}(a\|s)$ for the program version $P_{106}$ of the base program, and $S_{108}=F_{K_{108}}(a\|s)$ for the program version $P_{108}$ of the base program, where a is the user identifier for customer A, s is a secret of company S, and the operator ∥ indicates concatenation. The code-based signatures are unique across the two program versions because each signature is derived from the code-based key from the corresponding diverse software version.

After the signatures are generated, a signature incorporator 116 integrates (e.g., appends, inserts) the signatures into their corresponding program versions to generate a signed program 118, which is a signed instance of the program version 106, and a signed program 120, which is a signed instance of the program version 108. Examples of integrating a signature into two different executable program file formats are provided below, although the signatures may be incorporated into other executable program file formats as well.

In one implementation, that of an Executable and Linkable Format (ELF) file format, which is employed in operating systems including without limitation varieties of Linux and Unix, OpenVMS, BeOS, and Haiku, an ELF header is followed by a program header table and then by zero or more sections before closing with a section header table. The program header table describes zero or more memory segments. The section header table describes zero or more sections. The signature incorporator 116 can add a new section (or memory segment) to the ELF file to store the code-based signature generated by the signature generator 114 for the corresponding program version.

In another implementation, that of a Portable Executable (PE) file format, which is employed in operating systems including without limitations varieties of the Windows operating system, ReactOS, HX DOS Extender and a version of BeOS, a DOS header is followed by a DOS program, a PE signature, a PE file header, a PE optional header, and section headers, closing with zero or more sections. The signature incorporator 116 can add a new section (or memory segment) to the PE file to store the code-based signature generated by the signature generator 114 for the corresponding program version.

In some implementations, example signature generation operators use program code from the code section of a binary file (e.g., excluding one or more non-code sections) to generate a signature. Accordingly, adding a code-based signature to a program file does change the file but not the section(s) used for signature generation and verification. In other implementations, the program file format does not support relative virtual addressing (RVA) and instead uses absolute virtual address (AVA) to identify position-dependent instructions and position-dependent data. In file formats supporting AVA, the signature can be removed before verification, or other processing may be employed before (e.g., decompiling the functions and code section and updating the positioned-dependent instructions and data). In at least the latter scenario of updated these position-dependent elements, even file formats supporting AVA do not require removal of the signatures from the file prior to verification.

Figure 2:
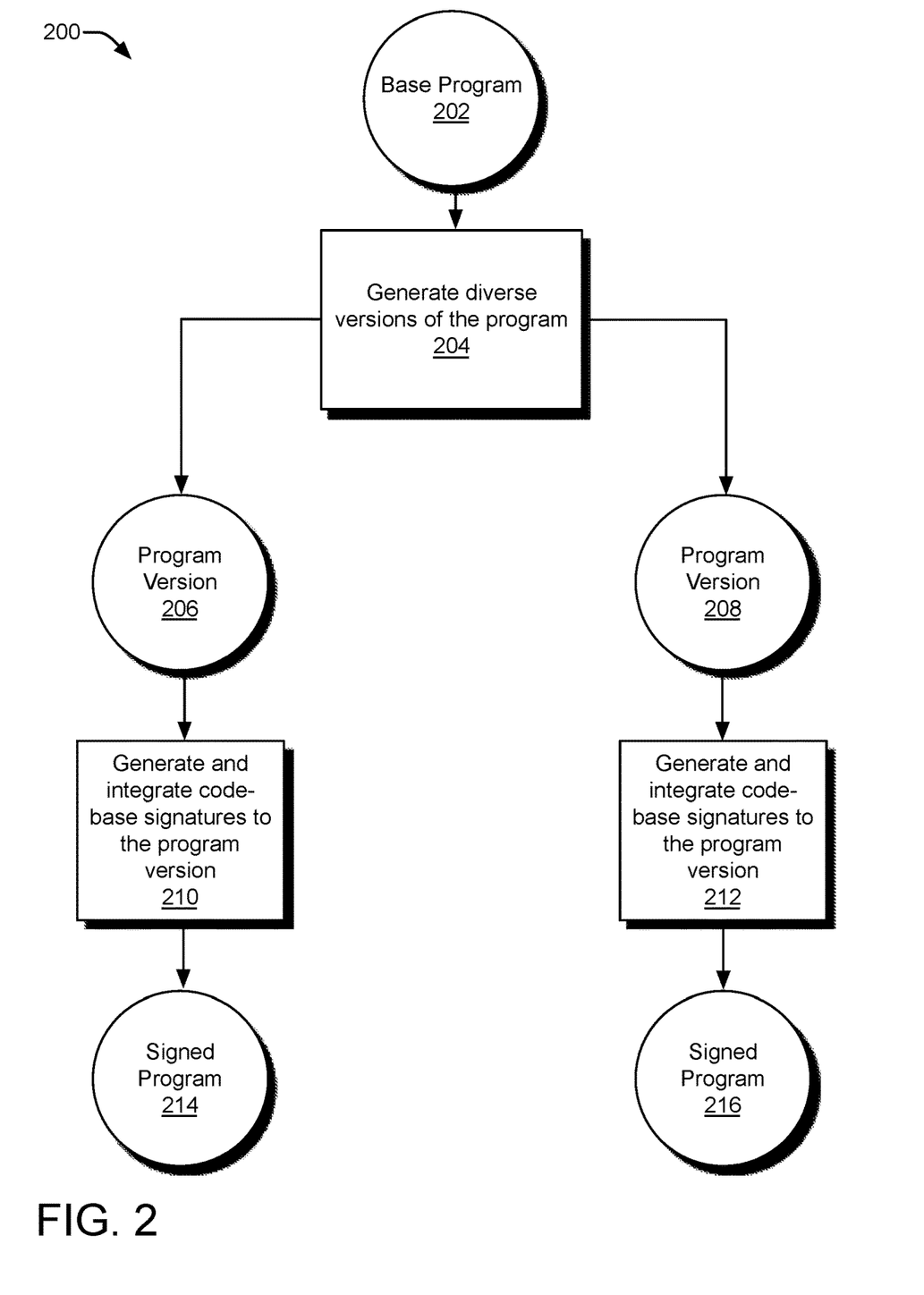
FIG. 2 illustrates example operations for signing programs using code-based signatures.

FIG. 2 illustrates example operations 200 for signing programs using code-based signatures. A diversity operation 204 receives a base program 202 and generates multiple structurally different but semantically equivalent versions (e.g., a program version 206 and program version 208) of the base program 202. For the following description, assume a company S with a secret s develops and/or owns the base program 202 and is signing different versions of the program for use by a customer A, identified by a user identifier a.

A signing operation 210 receives the program version 206 and derives a unique code-based key for each version based on some or all of the program code of that program version. Because the program code of each version is structurally unique and (pseudo)randomized, the derived code-based keys are also unique and (pseudo)random. For example, a key derivation function (KDF), such as a cryptographic hash function, can be applied to some or all of the program code of each version to yield unique code-based key $K_{206}$ corresponding to the program version 206. The signing operation 210 also generates a unique signature for the program version 206 using the derived unique code-based key using a bi-homomorphic pseudorandom function (PRF) F, which is described in more detail with respect to FIGS. 5-7. In one implementation, the signing operation 210 computes a code-based signature $S_{206}$ for the program version 206 and a code-based signature $S_{208}$ for the program version 208, such as by using the following computations, although other computations may be employed:

$S_{206}=F_{K_{206}}(a\|s)$ for the program version $P_{206}$ of the base program, and $S_{208}=F_{K_{208}}(a\|s)$ for the program version $P_{208}$ of the base program, where a is the user identifier for customer A, s is a secret of company S, and the operator ∥ indicates concatenation.

After the code-based signature is generated, the signing operation 210 signs the program version 206 by integrating (e.g., appending, inserting) the code-based signature into program version 206 to generate a signed program 214, which is a signed instance of the program version 206. A signing operation 212 performs similar sub-operations on the program version 208 to generate a signed program 216, which is a signed instance of the program version 208. The code-based signatures are unique across the two program versions because each signature is derived from the code-based key from the corresponding diverse software version.

Figure 3:
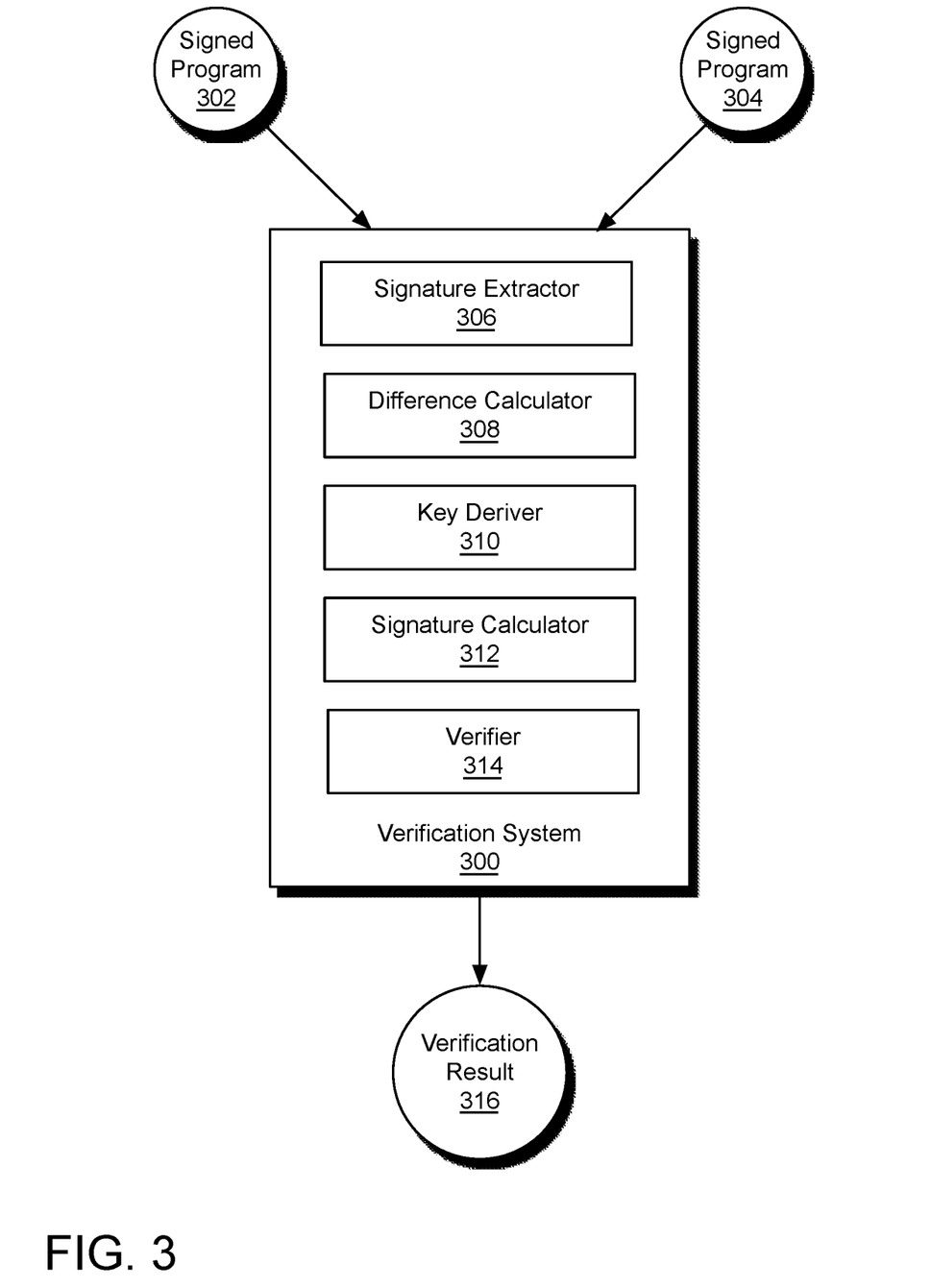
FIG. 3 illustrates an example verification system.

FIG. 3 illustrates an example verification system 300. For the following description, assume a company S with a secret s develops and/or owns the base program 202 and is signing different versions of the program for use by a customer A, identified by a user identifier a. In the illustrated implementation, the customer A wishes to verify the integrity of one or both diverse program versions (signed program 302 and signed program 304). It is assumed that the customer A is in possession of both of the signed programs.

The customer A can verify the code-based signatures of both the signed program 302 and the signed program 304. The signed program 302 and the signed program 304 are input to a verification system 300. A signature extractor 306 retrieves (e.g., reads) the code-based signatures from the signed programs. A difference calculator 308 computes a difference between the code-based signatures, such as by computing:

$$F_{K_{302}-K_{304}}(a\|0)=F_{K_{302}}(a\|s)-F_{K_{304}}(a\|s)=S_{302}-S_{304}, \quad (1)$$

where $F_{K_{302}}(a\|s)$ is the code-based signature $S_{302}$ of the signed program 302, which can be extracted from the binary instance of the signed program 302, and $F_{K_{304}}(a\|s)$ is the code-based signature $S_{304}$ of the signed program 304, which can be extracted from the binary instance of the signed program 304. Accordingly, computing the difference between these two signatures yields $F_{K_{302}-K_{304}}(a\|0)$ as a first code-based verification operand. Note that $F_{K_{302}-K_{304}}(a\|0)$ is independent of the secret s of the company S, which the customer A does not possess.

Because the customer A is in possession of both the signed program 302 and the signed program 304, a key deriver 310 of the verification system 300 can also derive the unique code-based keys $K_{302}$ and $K_{304}$ from the diverse code of the signed program 302 and the signed program 304, respectively. Key derivation is described with regard to the signature generation systems and processes of FIGS. 1 and 2, respectively. In some implementations, the same key derivation function and the same bi-homomorphic PRF family are used between the customer and the company. Generally, these are publicly available, but this public aspect does not weaken security because the secret s. Without the right mix of these parameters, the publicly available key derivation function and bi-homomorphic PRF family do not allow for verification. For example, the company S uses its secret s, which is not shared with the customer A, and the user identifier a to sign the program versions. Likewise, the customer A uses the (non)public user identifier a to verify the program versions based on the code-based signatures.

A signature calculator 312 computes a second code-based verification directly from the customer-derived, code-based keys $K_{302}$ and $K_{304}$, and the user identifier a, as follows:

$$F_{K_{302}-K_{304}}(a\|0). \quad (2)$$

A verifier 314 of the verification system 300 evaluates the first and second verification operands (e.g., the $F_{K_{302}-K_{304}}(a\|0)$ results computed in Equations (1) and (2)). If the verification operands match (e.g., are equal), then a successful verification is indicated in a verification result 316. If the verification operands do not match (e.g., are not equal), then a failed verification is indicated in the verification result 316. A failed verification indicates some level of corruption in one or both of the signed programs.

Figure 4:
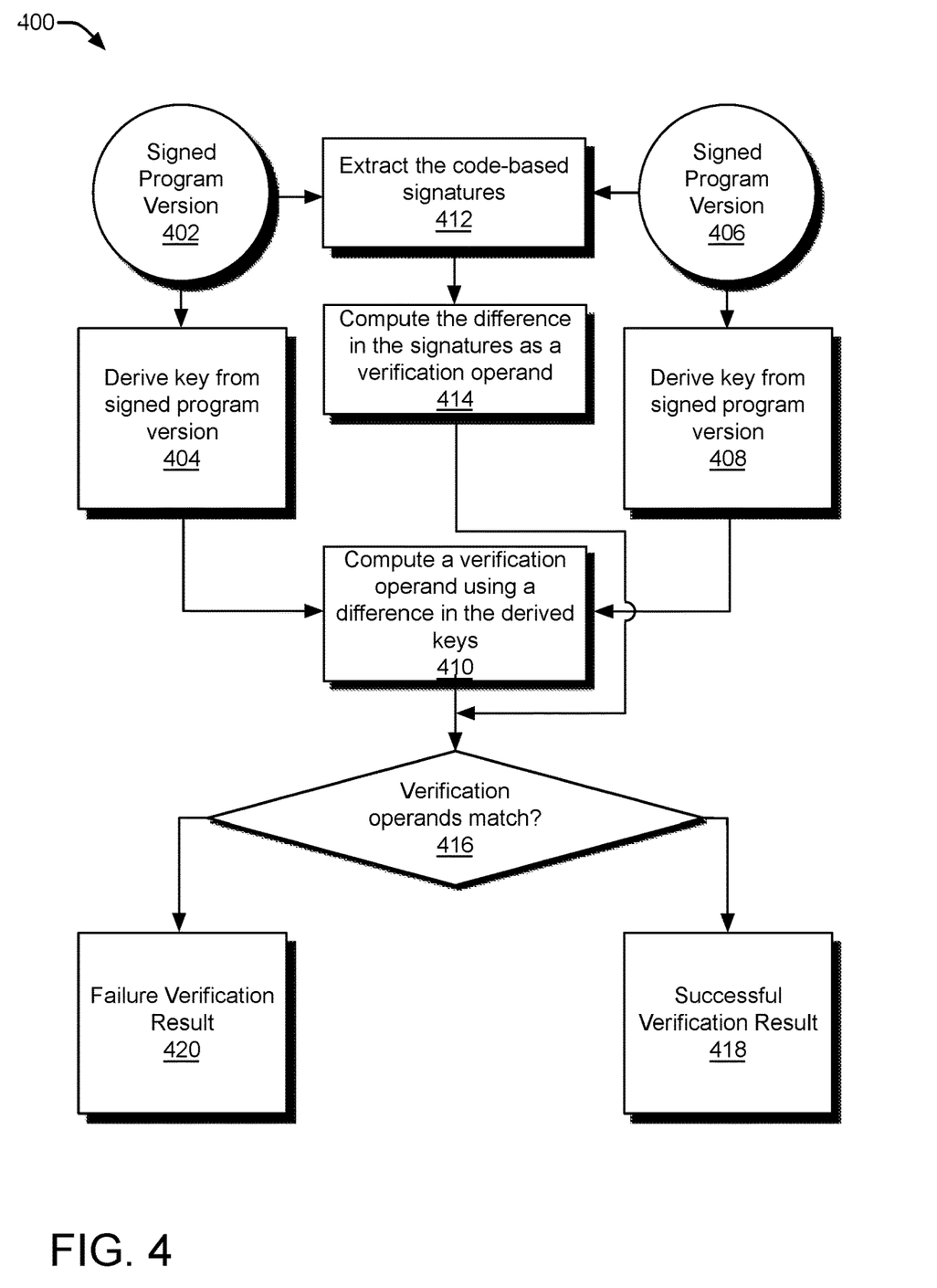
FIG. 4 illustrates example operations for verifying code-based signatures.

FIG. 4 illustrates example operations 400 for verifying code-based signatures. An extraction operation 412 receives as input a signed program version 402 and a signed program version 406, which are diverse versions of the same program, and extracts the code-based signatures $S_{402}$ and $S_{406}$ from the corresponding signed program versions. A difference operation 414 computes the difference between the code-based signatures $S_{402}$ and $S_{406}$ to yield a first verification operand, such as by computing:

$$F_{K_{402}-K_{406}}(a\|0)=F_{K_{402}}(a\|s)-F_{K_{406}}(a\|s)=S_{402}-S_{406}, \quad (3)$$

A key derivation operation 404 derives a unique code-based key $K_{402}$ from the program code of the signed program version 402. Another key derivation operation 408 derives a unique code-based key $K_{406}$ from the program code of the signed program version 406. Key derivation is described with regard to the signature generation systems and processes of FIGS. 1 and 2, respectively. A verification operand computation operation 410 computes a second verification operand using a difference in the derived keys, such as by computing:

$$F_{K_{402}-K_{406}}(a\|0) \quad (4)$$

A decision operation 416 evaluates the first and second verification operands (e.g., the $F_{K_{402}-K_{406}}(a\|0)$) results computed in Equations (3) and (4)). If the verification operands match (e.g., are equal), then a successful verification is indicated in a successful verification result 418. If the verification operands do not match (e.g., are not equal), then a failed verification is indicated in a failed verification result 420. A failed verification indicates some level of corruption in one or both of the signed programs.

FIG. 5 illustrates example key homomorphism 500 providing useful concepts for code-based signatures. In a pseudorandom functions (PRF) family, $\mathcal{F}$, each function F is specified by a short, random key (e.g., s, t) and can be easily computed given the key. Yet the function behaves like a random one, in the sense that if a party is not given the key and is computationally bounded, then the input-output behavior of the function looks like that of a random function. For a PRF $F_s \in \mathcal{F}$, the index s is called its key or seed. Many variants of PRFs may be employed. Accordingly, in the context of key homomorphism 500, an addition or subtraction operation 502 applied to a "key homomorphic" PRF F receives two ciphertext operands $C_1=F_s(x)$ and $C_2=F_t(x)$ and outputs $C_3=F_{s\pm t}(x)$. In one implementation of key homomorphism applied to code-based signatures, a difference between two PRF F results representing signatures computed using different code-based keys s and t (e.g., $K_{302}$ and $K_{304}$) derived from different program versions and with the same input x (e.g., (a∥s)) yields a result $F_{s-t}(x)$ (e.g., $F_{K_{302}-K_{304}}(a\|s)$).

FIG. 6 illustrates example input homomorphism 600 providing useful concepts for code-based signatures. A PRF family $\mathcal{F}$ is deemed "input homomorphic" if the input is sampled from a group and there is an efficient algorithm that, given $F_s(x)$ and $F_s(y)$, outputs $F_s(x\pm y)$. Accordingly, in the context of input homomorphism 600, an addition or subtraction operation 602 applied to an "input homomorphic" PRF F receives two ciphertext operands $C_1=F_s(x)$ and $C_2=F_s(y)$ and outputs $C_3=F_s(x\pm y)$. In one implementation of input homomorphism applied to code-based signatures, a difference between two PRF F results computed using the same key s (e.g., $K_{302}-K_{304}$) with the different inputs x and y (e.g., (a∥s) and (a∥0)) to yield a result $F_s(x\pm y)$ (e.g., $F_{K_{302}-K_{304}}(0\|s-0)$).

FIG. 7 illustrates example bi-homomorphism 700 useful for code-based signatures. A bi-homomorphic PRF family F: $\mathcal{K} \times \mathcal{X} \rightarrow \mathcal{Y}$ is fully key homomorphic and partially input homomorphic. Given $F_s(x\|y)$ and $F_t(x\|z)$, there is an efficient algorithm to compute $F_{s\pm t}(x\|y\pm z)$, where ∥ denotes concatenation. Note that input homomorphism is restricted to a fixed m-out-of-n input bits, where |y|=|z|=n, m<n; the remaining n−m(=|x|) bits are identical in both inputs. Accordingly, in the context of bi-homomorphism 700, an addition or subtraction operation 702 applied to a "bi-homomorphic" PRF F, with ciphertext operands $C_1=F_s(x\|y)$ and $C_2=F_t(x\|z)$, generates a ciphertext result $C_3$, such that $C_3=F_{s\pm t}(x\|y\pm z)$. In one implementation of bi-homomorphism applied to code-based signatures, a difference between two PRF F results computed using different keys s and t (e.g., $K_{302}$ and $K_{304}$) with the different inputs x and y (e.g., (a∥s) and (a∥0)) to yield a result $F_{s\pm t}(x\|y\pm z)$ (e.g., $F_{K_{302}-K_{304}}(a\|s-0)$).

Figure 8:
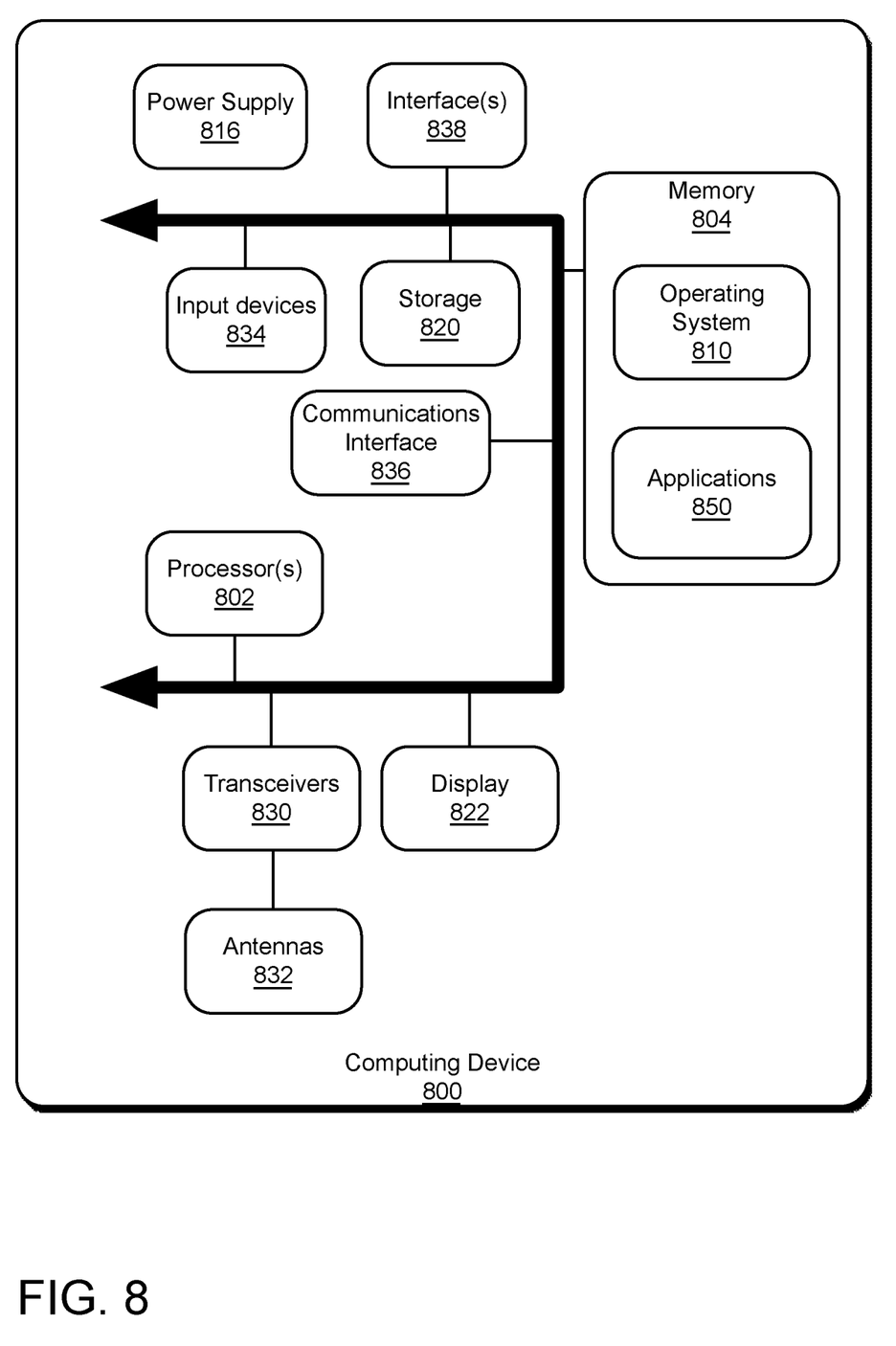
FIG. 8 illustrates an example computing device for implementing the features and operations of the described technology.

FIG. 8 illustrates an example computing device 800 for implementing the features and operations of the described technology. The computing device 800 may embody a remote control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 800 includes one or more hardware processor(s) 802 and a memory 804. The memory 804 generally includes both volatile memory (e.g., RAM) and nonvolatile memory (e.g., flash memory). An operating system 810 resides in the memory 804 and is executed by the hardware processor(s) 802.

In an example computing device 800, as shown in FIG. 8, one or more modules or segments, such as applications 850, a software diversity generator, a key generator, a signature generator, a signature incorporator, a code-based signing system, and other services, workloads, and modules, are loaded into the operating system 810 on the memory 804 and/or storage 820 and executed by hardware processor(s) 802. The storage 820 may include one or more tangible storage media devices and may store program code, code-based keys, code-based signatures, verification operands, verification results, and other data and may be local to the computing device 800 or may be remote and communicatively connected to the computing device 800.

The computing device 800 includes a power supply 816, which is powered by one or more batteries or other power sources and which provides power to other components of the computing device 800. The power supply 816 may also be connected to an external power source that overrides or recharges the built-in batteries or other power sources.

The computing device 800 may include one or more communication transceivers 830 that may be connected to one or more antenna(s) 832 to provide network connectivity (e.g., mobile phone network, Wi-Fi®, Bluetooth®) to one or more other servers and/or client devices (e.g., mobile devices, desktop computers, or laptop computers). The computing device 800 may further include a network adapter 836, which is a type of computing device. The computing device 800 may use the adapter and any other types of computing devices for establishing connections over a wide-area network (WAN) or local-area network (LAN). It should be appreciated that the network connections shown are exemplary and that other computing devices and means for establishing a communications link between the computing device 800 and other devices may be used.

The computing device 800 may include one or more input devices 834 such that a user may enter commands and information (e.g., a keyboard or mouse). These and other input devices may be coupled to the server by one or more interfaces 838, such as a serial port interface, parallel port, or universal serial bus (USB). The computing device 800 may further include a display 822, such as a touch screen display.

The computing device 800 may include a variety of tangible processor-readable storage media and intangible processor-readable communication signals. Tangible processor-readable storage can be embodied by any available media that can be accessed by the computing device 800 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more hardware processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote control device and/or a physical controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server computing devices.

While this specification contains many specific implementation details, these should not be construed as limitations on the scope of any inventions or of what may be claimed, but rather as descriptions of features specific to particular embodiments of particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A computing-processor-implemented method comprising:
   receiving at least two unique versions of program code of a program;
   generating a code-based key for each unique version of the program code; and
   generating a code-based signature for each unique version of the program using a bi-homomorphic pseudorandom function selected from a family of bi-homomorphic pseudorandom functions, each code-based signature being generated by the selected bi-homomorphic pseudorandom function based on the corresponding code-based key.

2. The computing-processor-implemented method of claim 1, further comprising:
   incorporating the generated code-based signature for each unique version of the program code into the program code of the corresponding unique version of the program.

3. The computing-processor-implemented method of claim 1, wherein the generated code-based signatures are verifiable using any bi-homomorphic pseudorandom function selected from the family based on a difference of the code-based keys derived from the program code of the unique versions of the program.

4. The computing-processor-implemented method of claim 1, wherein the at least two unique versions of the program code of the program are structurally different from each other.

5. The computing-processor-implemented method of claim 1, wherein the bi-homomorphic pseudorandom function is key homomorphic and input homomorphic.

6. The computing-processor-implemented method of claim 5, wherein the bi-homomorphic pseudorandom function is fully key homomorphic and partially input homomorphic.

7. The computing-processor-implemented method of claim 1, wherein the generated code-based signatures are verifiable using any bi-homomorphic pseudorandom function selected from the family that is used to generate the code-based signatures.

8. The computing-processor-implemented method of claim 1, wherein the generated code-based signatures are verifiable using code-based keys that are used to generate the code-based signatures.

9. A system comprising:
   one or more hardware processors;
   a key generator executable by the one or more hardware processors and configured to generating a code-based key for each unique version of at least two unique versions of program code of a program; and
   a signature generator executable by the one or more hardware processors and configured to generate a code-based signature for each unique version of the program using a bi-homomorphic pseudorandom function selected from a family of bi-homomorphic pseudorandom functions, each code-based signature being generated by the selected bi-homomorphic pseudorandom function based on the corresponding code-based key.

10. The system of claim 9, further comprising:
    a signature incorporator executable by the one or more hardware processors and configured to incorporate the generated code-based signature for each unique version of the program code into the program code of the corresponding unique version of the program.

11. The system of claim 9, wherein the generated signatures are verifiable using any bi-homomorphic pseudorandom function selected from the family based on a difference of the code-based keys derived from the program code of the unique versions of the program.

12. The system of claim 9, wherein the at least two unique versions of the program code of the program are structurally different from each other.

13. The system of claim 9, wherein the generated code-based signatures are verifiable using any bi-homomorphic pseudorandom function selected from the family that is used to generate the code-based signatures.

14. The system of claim 9, wherein the generated code-based signatures are verifiable using code-based keys that are used to generate the code-based signatures.

15. One or more tangible processor-readable storage media embodied with instructions for executing on one or more processors and circuits of a computing device a process comprising:
    receiving at least two unique versions of program code of a program;
    generating a code-based key for each unique version of the program code; and
    generating a code-based signature for each unique version of the program using a bi-homomorphic pseudorandom function selected from a family of bi-homomorphic pseudorandom functions, each code-based signature being generated by the selected bi-homomorphic pseudorandom function based on the corresponding code-based key.

16. The one or more tangible processor-readable storage media of claim 15 wherein the process further comprises:
incorporating the generated code-based signature for each unique version of the program code into the program code of the corresponding unique version of the program.

17. The one or more tangible processor-readable storage media of claim 15 wherein the generated signatures are verifiable using any bi-homomorphic pseudorandom function selected from the family based on a difference of the code-based keys derived from the program code of the unique versions of the program.

18. The one or more tangible processor-readable storage media of claim 15 wherein the at least two unique versions of the program code of the program are structurally different from each other.

19. The one or more tangible processor-readable storage media of claim 15 wherein the generated code-based signatures are verifiable using any bi-homomorphic pseudorandom function selected from the family that is used to generate the code-based signatures.

20. The one or more tangible processor-readable storage media of claim 15 wherein the generated code-based signatures are verifiable using code-based keys that are used to generate the code-based signatures.

* * * * *